Figure 1:
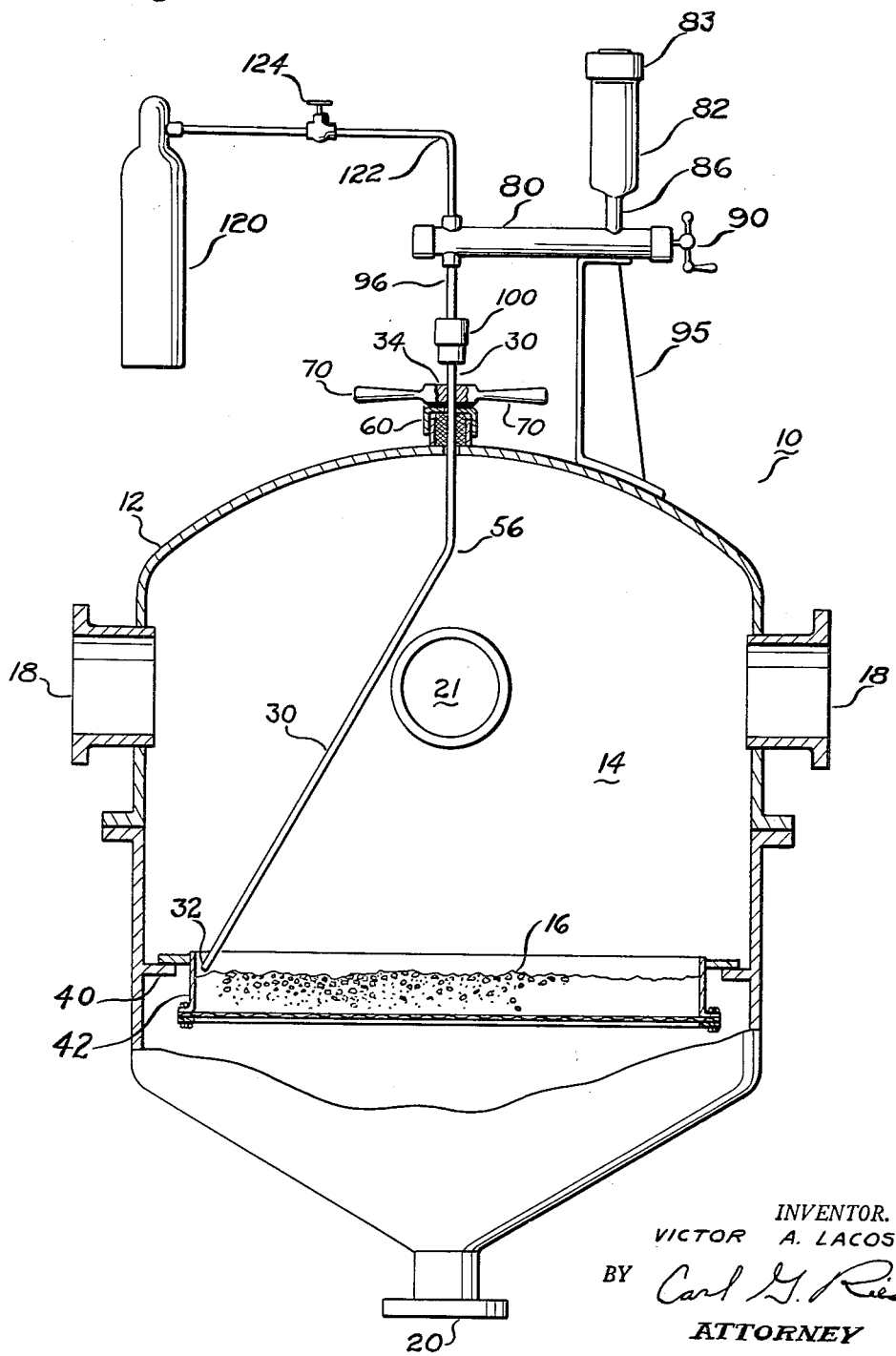

May 15, 1956  V. A. LACOSTE  2,745,722
APPARATUS FOR CALKING CATALYST BED
Filed June 17, 1953

INVENTOR.
VICTOR A. LACOSTE
BY Carl G. Ries
ATTORNEY

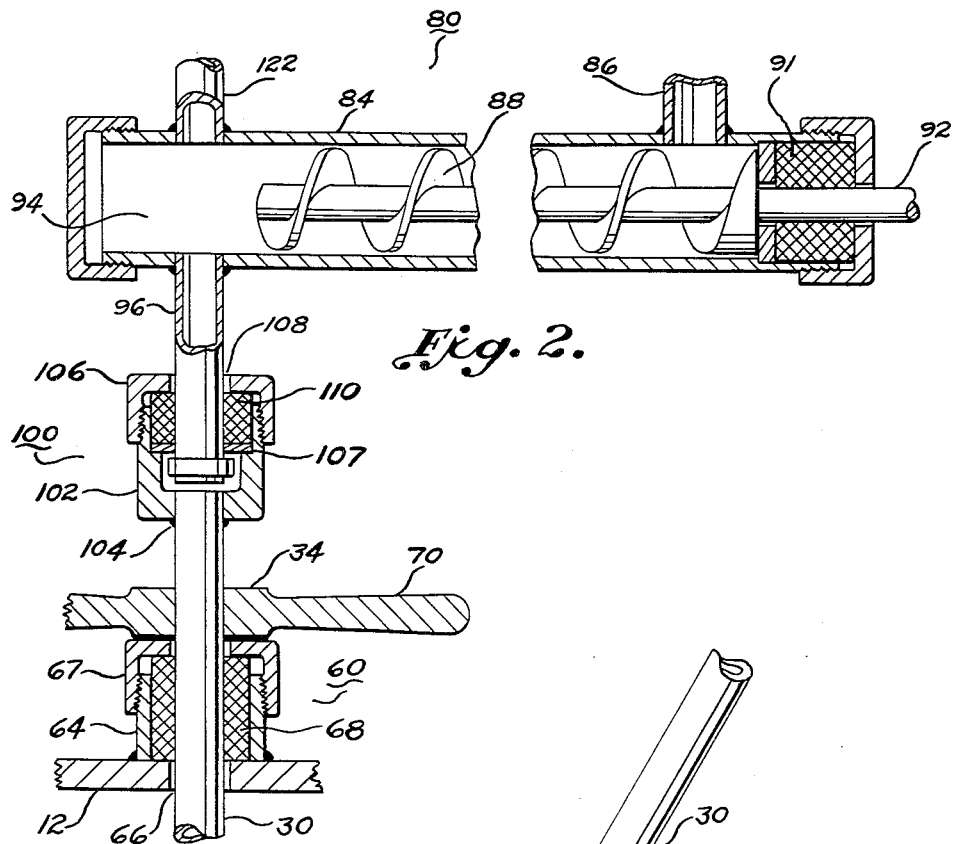
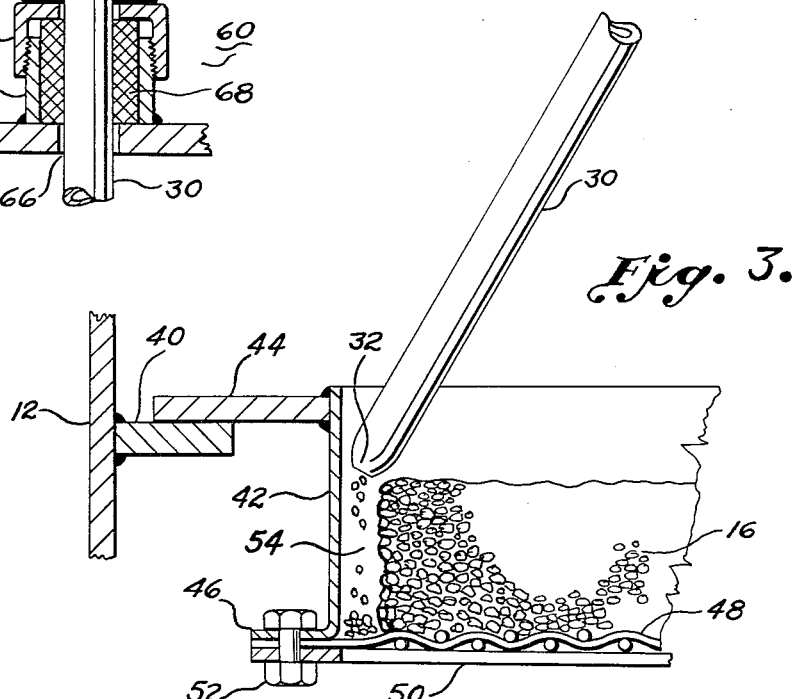

United States Patent Office 2,745,722
Patented May 15, 1956

2,745,722

APPARATUS FOR CALKING CATALYST BED

Victor A. Lacoste, Three Rivers, Mass., assignor to Monsanto Chemical Company, St. Louis, Mo., a corporation of Delaware Application June 17, 1953, Serial No. 362,211

10 Claims. (Cl. 23—288)

This invention relates to apparatus for calking a catalyst bed in a closed reactor while catalytic chemical reactions are in progress. More particularly, this invention relates to apparatus for calking the peripheral edge of a bed of finely-divided catalyst in a closed reactor without interrupting catalytic chemical reactions being conducted therein.

It is common practice to conduct catalytic chemical reactions in a continuous manner by passing fluent chemical reactants into a closed reaction chamber containing a bed of finely-divided solid catalyst; the reactants being forced through the small passages between the individual particles of catalyst in order to bring about the desired chemical reaction. Generally speaking, it is necessary that all portions of the chemical reactants be brought into direct intimate contact with the catalyst in order to obtain satisfactory results. Therefore, the catalyst bed is generally of a cross-sectional area substantially equal to the cross-sectional area of a reaction chamber.

Many finely-divided catalysts, especially finely-divided metallic silver catalysts, shrink at irregular intervals during the course of continuous reactions, this shrinkage frequently taking the form of radial contraction. When this happens, a gap is formed about the periphery of the catalyst bed and a portion of the reactants will pass through such a peripheral gap without contacting the catalyst. As a result, the desired chemical reaction will not be complete. In addition, undesirable side reaction frequently occurs under such conditions. Therefore, when such a peripheral gap forms, it is generally necessary to interrupt operations and calk the catalyst bed.

Catalyst bed shrinkage presents a particularly serious problem when formaldehyde is being prepared in a closed reactor by a continuous process. Formaldehyde is conventionally prepared by passing methanol and oxygen through a catalyst bed comprising a finely-divided catalyst, such as granular metallic silver.

When radial shrinkage of the catalyst bed occurs, some of the methanol and oxygen will pass through the gap about the peripheral edge of the catalyst bed where formic acid rather than formaldehyde will be formed. Formic acid is a very undesirable contaminant and if more than a minor amount is present in the formaldehyde, it must be removed by costly refining operations. Since formic acid is catalytically formed in excessive amounts even when there is a slight gap, such as a gap of only one-eighth of an inch, continuous operations must be interrupted at all too frequent intervals in order to calk the catalyst bed.

Accordingly, an object of the present invention is the provision of apparatus for calking the peripheral edge of a catalyst bed in a closed reaction chamber.

Another object is the provision of apparatus for calking the peripheral edge of a catalyst bed mounted in a closed reaction chamber without interrupting continuous catalytic chemical reactions being conducted therein.

A further object is the provision of apparatus for preventing the catalytic evolution of formic acid when formaldehyde is being prepared by bringing methanol and oxygen into contact with a finely-divided catalyst.

The manner in which these and other objects are attained will be apparent from the following description when considered in connection with the accompanying drawings illustrating a preferred form of the invention. In the drawings, Figure 1 is a side elevation, partly in section, of a conventional closed chamber reactor having mounted thereon a preferred form of the apparatus embodying the present invention;

Figure 2 is a fragmentary side elevation on an enlarged scale, partly in section, of a portion of the apparatus shown in Figure 1, this view showing more clearly the manner in which the apparatus of the present invention is mounted on the reactor; and Figure 3 is a sectional fragmentary side elevation on an enlarged scale of a portion of the reactor shown in Figure 1, this view showing more clearly the manner in which the peripheral edge of a catalyst bed is calked in accordance with the present invention.

The apparatus of the present invention may be used in conjunction with a closed reactor such as the reactor 10 illustrated schematically in Figure 1, which comprises a wall 12 defining a closed reaction chamber 14 containing a horizontally disposed catalyst bed 16 having a diameter approaching the diameter of the reaction chamber 14. Inlet ports 18 in the wall 12 above the catalyst bed 16 admit fluent reactants which are forced through the catalyst bed 16 by a suitable pressure means such as a non-reactive gas. Reaction products leave the reaction chamber 14 through a discharge port 20. A sight glass 21 permits visual inspection of the reaction chamber 14 and the catalyst bed 16.

When radial contraction of the catalyst bed 16 occurs during operations a gap will be formed about the peripheral edge thereof. In accordance with the present invention, such a gap is closed without interrupting operations by forcing an additional amount of finely-divided catalyst through a rotatable conduit 30 that enters the reaction chamber 14 above the catalyst bed 16 and terminates above in close proximity to the peripheral edge thereof. The conduit 30 is manipulated so that the fresh supply of catalyst is deposited uniformly about the peripheral edge of the catalyst bed 16 in order to close the gap formed by radial shrinkage.

The catalyst bed 16 is formed of any suitable finely-divided catalyst, preferably a granular catalyst. The particular catalyst to be used will be determined by the type of chemical reaction to be conducted, the nature of the chemical reactants to be employed and the conditions under which the reaction is to be conducted. While the apparatus of the present invention is advantageously used to calk a catalyst bed formed of any particulate catalyst subject to radial shrinkage, the apparatus is used with particular advantage when the catalyst is a granular silver catalyst.

Any suitable means may be used to support the catalyst bed 16 in the reaction chamber 14. As shown in Figure 1 and more clearly in Figure 3, such a support may comprise a horizontal annular ring 40 fixed to the inner surface of the wall 12 for the support of a circular channel member 42 having outwardly extending upper and lower flanges 44 and 46, respectively. The upper flange 44 is suitably fixed to the annular ring 40 in order to provide a gas-tight seal and the catalyst bed 16 is held in position by a perforate support member such as screen 48, fixed to the lower flange 46. The screen 48 may be attached to the flange 46 by any suitable means. Thus, it may be sandwiched between the lower surface of the flange 46 and the upper surface of a retaining ring 50 secured to the flange 46 by means of a plurality of nuts and bolts 52. Normally, the peripheral edge of the catalyst bed 16 will be in contact with the inner surface of the channel member 42 as shown in Figure 1. As shown in Figure 3, when radial shrinkage of the catalyst bed 16 occurs, a gap 54 is formed between the channel member 42 and the peripheral edge of the catalyst bed 16. The gap 54 is closed by calking the peripheral edge of the catalyst bed 16 with a fresh supply of finely-divided catalyst delivered thereto through the rotatable conduit 30.

The rotatable conduit 30 should enter the reaction chamber 14 above the catalyst bed 16 through a gas-tight seal 60. The discharge end 32 of the conduit 30 should be supported in a manner such that it is maintained above and in close proximity to the peripheral edge of the catalyst bed 16 as the conduit 30 is rotated. If this is not done, the desired calking will not be obtained. The discharge end 32 of the conduit 30 is preferably necked down slightly as shown in Figure 3 in order to more accurately direct the supply of fresh catalyst into the gap 54.

Generally speaking, the location of the inlet ports 18 and the cross-sectional shape of the reaction chamber 14 will determine the manner in which the discharge end 32 of the conduit 30 is supported above the catalyst bed 16. When the inlet ports 18 are located about the sides of a reaction chamber 14 having a circular cross-section, the relatively simple apparatus shown in the drawings may be used to calk the catalyst bed 16. In the illustrated embodiment of the invention, the conduit 30 enters the reaction chamber 14 through a gas-tight seal 60 that is directly above the center of the catalyst bed 16. The conduit 30 is bent at an angle 56 such that the discharge end 32 terminates directly above and in proximity to the peripheral edge of the catalyst bed 16. Since the conduit 30 enters the reaction chamber 14 directly above the center of the catalyst bed 16, the discharge end 32 thereof may be supported in the desired manner by the simple expedient of a collar 34 fixed to conduit 30 and bearing against the upper surface of the seal 60.

Turning now to Figure 2, any suitable seal 60 may be used as, for example, a seal comprising a threaded tube 64 fixed about an opening 66 in the top of the wall 12, a cap 67 being threaded on the tube 64 in order to provide a closed chamber containing a packing 68 in sealing engagement with the inner surface of the tube 64 and the outer surface of the conduit 30. The conduit 30 is rotated by any suitable means such as handles 70 fixed to the collar 34.

The outer end of the conduit 30 is connected with a suitable means for delivering a supply of finely-divided catalyst thereto. Such a catalyst supply means may comprise, for example, a feeder 80 for delivering finely-divided catalyst from a hopper 82 provided with a gas-tight cover 83. Any conventional feeder may be used for this purpose, such as an extruder comprising a casing 84 defining a cylindrical bore having an inlet port connected with the hopper 82 by means of a conduit 86. A screw 88 is rotatably mounted in the bore of the casing, suitable means being provided to rotate the same such as, for example, crank 90 attached to the shaft 92 of the screw 88. Shaft 92 passes through suitable gas-tight packing seal 91. The screw 88 is preferably terminated short of the outer end of the casing 84 in order to provide a closed discharge chamber 94. The extruder 80 is supported by any suitable means such as a bracket 95.

The discharge chamber 94 is connected with the conduit 30 by any suitable means such as a pipe 96. A gas-tight seal is provided at the juncture of the pipe 96 with the conduit 30, such a seal preferably comprising a rotary joint 100. The rotary joint 100 may be of any suitable construction including, for example, a threaded tube 102 tightly fixed to the inlet end of the conduit 30 by any suitable means such as a weld. A cap 106 having an opening 108 is threaded to the tube 102 to provide a closed chamber into which the pipe 96 extends. A gas-tight seal is obtained by means of a suitable packing 110 in sealing engagement with the inner surface of the cap 106 and the outer surface of the pipe 96, the packing 106 being held in place by means of a retaining ring 107.

Since most continuous chemical reactions are conducted by forcing the reactants into the reaction chamber under pressure, it is preferable to provide a pressure means connected with the discharge chamber 95 for positively forcing the finely-divided catalyst through conduit 30. Any suitable pressure means may be used. One manner in which this may be accomplished is through the use of a chemically non-reactive gas which is delivered from a storage tank 120 to the discharge chamber 94 by any suitable means such as the tube 122. A valve 124 of any suitable conventional construction is provided to control the flow of gas through the tube 122. Preferably, the tube 122 is connected to the discharge chamber 94 in such a manner that the feeder 80 is intermediate the discharge end of the tube 122 and the inlet end of the discharge pipe 96. When this construction is adopted, the catalyst delivered to the discharge chamber 94 by the screw 88 of the extruder 80 is positively forced into the discharge pipe 96 with minimum turbulence.

*Operation*

When a catalytic chemical reaction is to be conducted in a continuous fashion, the catalyst bed 16 is brought to reaction temperature by any suitable means, such as by passing a heated chemically non-reactive gas therethrough. When the desired temperature has been reached, the chemical reactants are charged to the reactor 10 through the inlet ports 18 and forced through the catalyst bed 16 where reaction takes place. The reaction products are withdrawn through the discharge port 20.

For example, if formaldehyde is to be prepared, a suitable catalyst such as finely-divided granular metallic silver is deposited in the reactor 10 in the form of a catalyst bed 16 and brought to the desired reaction temperature. A mixture of methanol, oxygen and a chemically inert gas such as nitrogen is then fed under pressure to the reactor 10 through the inlet ports 18. As the methanol and oxygen pass through the silver catalyst bed 16, an exothermic catalytic reaction occurs and the methanol and oxygen are converted to formaldehyde and water, the reaction products being withdrawn from the reactor through the discharge port 20. At unpredictable intervals, radial shrinkage of the silver catalyst bed 16 will occur and a gap 54 will be formed about the periphery of the catalyst bed 16. The methanol and oxygen passing through the gap 54 will be largely converted into formic acid rather than formaldehyde. When this occurs, the catalyst bed 16 must be calked.

In order to calk the catalyst bed 16 using the apparatus illustrated in the drawings, the valve 124 is opened and a chemically non-reactive gas such as nitrogen flows from the storage tank 120 through the tube 122 into the discharge chamber 94 and thence through the pipe 96 and the conduit 30 into the reaction chamber. After the valve 124 has been opened, a fresh supply of catalyst is delivered from the hopper 82 to the discharge chamber 94 by rotating the screw 88 by means of the crank 90. The granular catalyst delivered to the discharge chamber 94 by the screw 88 will be carried along by the stream of flowing gas and forced through the conduit 30. The conduit 30 is rotated by means of the handles 70 as the fresh supply of granular catalyst is forced therethrough. As shown more clearly in Figure 3, the fresh catalyst will be discharged from the conduit 30 directly above the peripheral edge of the catalyst bed 16 and will be forced into the gap 54 between the inner surface of the channel member 42 and the peripheral edge of the catalyst bed 16. The fresh catalyst will be retained on the screen 48, thus effectively closing the gap 54.

Having thus described my invention, what I claim is:

1. In a reactor comprising a wall defining a reaction chamber containing a horizontally disposed bed of finely-divided catalyst, calking apparatus for depositing a supply of fresh catalyst about the peripheral edge of said catalyst bed in order to compensate for radial contraction thereof, said calking apparatus comprising a gas-tight seal in said wall above said catalyst bed, a rotatable conduit of comparatively small cross-sectional area entering said chamber through said seal and terminating in a discharge end at a point above and in proximity to the peripheral edge of said catalyst bed, and means connected to said conduit for maintaining said discharge end of said conduit above and in close proximity to said peripheral edge as said conduit is rotated.

2. In a reactor comprising a wall defining a reaction chamber containing a horizontally disposed bed of finely-divided catalyst, calking apparatus for depositing a supply of fresh catalyst about the peripheral edge of said catalyst bed in order to compensate for radial contraction thereof, said calking apparatus comprising a gas-tight seal in said wall above said catalyst bed, a rotatable conduit of comparatively small cross-sectional area entering said chamber through said seal and terminating in a discharge end at a point above and in proximity to the peripheral edge of said catalyst bed, means connected to said conduit for maintaining said discharge end above and in proximity to said peripheral edge as said conduit is rotated and means connected to said conduit for delivering a fresh supply of finely-divided catalyst thereto.

3. In a reactor comprising a wall defining a reaction chamber containing a horizontally disposed bed of finely-divided catalyst, calking apparatus for depositing a supply of fresh catalyst about the peripheral edge of said catalyst bed in order to compensate for radial contraction thereof, said calking apparatus comprising a gas-tight seal in said wall above said catalyst bed, a rotatable conduit of comparatively small cross-sectional area entering said chamber through said seal and terminating in a discharge end at a point above and in proximity to the peripheral edge of said catalyst bed, means connected to said conduit for maintaining said discharge end above and in proximity to said peripheral edge as said conduit is rotated, catalyst supply means connected to said conduit for delivering a fresh supply of finely-divided catalyst thereto and pressure means connected to said conduit for forcing said supply of fresh catalyst therethrough, said catalyst supply means being connected to said conduit intermediate said pressure means and the discharge end of said conduit.

4. In a reactor comprising a wall defining a reaction chamber containing a horizontally disposed circular bed of finely-divided catalyst, calking apparatus for depositing a supply of fresh catalyst about the peripheral edge of said catalyst bed in order to compensate for radial contraction thereof, said calking apparatus comprising a gas-tight seal in said wall directly above the center of said catalyst bed, a rotatable conduit of comparatively small cross-sectional area entering said chamber through said seal and terminating in a discharge end at a point above and in proximity to the peripheral edge of said catalyst bed and means connected to said conduit for maintaining said discharge end above and in proximity to said peripheral edge as said conduit is rotated.

5. A calking apparatus as in claim 4 wherein catalyst supply means is connected to said conduit exteriorly of said reaction chamber for delivering a supply of fresh finely-divided catalyst thereto and wherein pressure means is connected to said conduit for forcing said fresh supply of catalyst therethrough, said catalyst supply means being connected to said conduit intermediate said pressure means and the discharge end of said conduit.

6. A reactor comprising a wall defining a closed reaction chamber, a bed of finely-divided catalyst horizontally mounted in said reaction chamber, a gas-tight seal in said wall above said catalyst bed, a rotatable conduit of comparatively small cross-sectional area for depositing a supply of fresh finely-divided catalyst about the peripheral edge of said catalyst bed in order to compensate for radial contraction thereof, said conduit entering said chamber through said seal and terminating above and in proximity to said peripheral edge and means connected to said conduit for supporting said discharge end above and in proximity to said peripheral edge as said conduit is rotated.

7. A reactor as in claim 6 wherein catalyst supply means is connected to said conduit exteriorly of said reaction chamber for delivering a supply of fresh finely-divided catalyst thereto and wherein pressure means is connected to said conduit for forcing said fresh supply of catalyst therethrough, said catalyst supply means being connected to said conduit intermediate said pressure means and the discharge end of said conduit.

8. A reactor comprising a wall defining a reaction chamber, a circular bed of finely-divided catalyst horizontally mounted in said chamber, a gas-tight seal in said wall above said catalyst bed, a rotatable conduit of comparatively small cross-sectional area for depositing a supply of fresh finely-divided catalyst about the peripheral edge of said catalyst bed in order to compensate for radial contraction thereof, said conduit entering said chamber through said seal and terminating above and in proximity to said peripheral edge, means connected to said conduit for supporting said discharge end above and in proximity to said peripheral edge as said conduit is rotated, catalyst supply means connected to said conduit exteriorly of said reaction chamber for delivering a fresh supply of finely-divided catalyst thereto, pressure means connected to said conduit for forcing said fresh supply of catalyst therethrough, said catalyst supply means being connected to said conduit intermediate said pressure means and the discharge end of said conduit and means for rotating said conduit.

9. A reactor comprising a wall defining a reaction chamber, a circular bed of finely-divided catalyst horizontally mounted in said chamber, a gas-tight seal in said wall above said catalyst bed, a rigid rotatable conduit of comparatively small cross-sectional area for depositing a supply of fresh finely-divided catalyst about the peripheral edge of said catalyst bed in order to compensate for radial contraction thereof, said conduit entering said chamber through said seal and terminating above and in proximity to said peripheral edge of said catalyst bed, a collar bearing against the upper surface of said seal fixed to said conduit for maintaining said discharge end above and in proximity to said peripheral edge of said catalyst bed an said conduit is rotated, a catalyst supply chamber connected to said conduit exteriorly of said reaction chamber, pressure means connected to said catalyst supply chamber for supplying a non-reactive gas thereto under pressure, catalyst supply means connected to said catalyst supply chamber intermediate said pressure means and said conduit for delivering a fresh supply of finely-divided catalyst to said catalyst supply chamber and means connected to said conduit for rotating the same.

10. A reactor as in claim 9 wherein the catalyst supply means comprises an elongate hollow casing having an inlet end for the reception of finely-divided catalyst delivered thereto and a discharge end connected to said catalyst supply chamber, a screw rotatably mounted in said casing for delivering finely-divided catalyst to said catalyst supply chamber and means connected to said screw for rotating the same.

References Cited in the file of this patent

UNITED STATES PATENTS

| | | |
|---|---|---|
| 853,016 | Jonson | May 7, 1907 |
| 1,531,788 | Jefferson | Mar. 31, 1925 |
| 2,088,929 | Scharff et al. | Aug. 3, 1937 |
| 2,222,884 | Stowe | Nov. 26, 1940 |
| 2,634,009 | Weitzenkorn | Apr. 7, 1953 |